United States Patent

[11] 3,542,465

[72] Inventors Arnold L. Pundsack
47 Aspen Dr., Rochester;
Raymond Egnaczak, 658 East Town Line Road, Williamson, New York

[21] Appl. No. 665,050
[22] Filed Sept. 1, 1967
[45] Patented Nov. 24, 1970

[73] Assignee Xerox Corporation
Rochester, New York
a corporation of New York

[54] CAMERA WITH DEVELOPMENT MEANS
18 Claims, 3 Drawing Figs.

[52] U.S. Cl. .......... 355/3; 95/13; 355/10
[51] Int. Cl. .......... G03g 15/00, G03g 15/10
[50] Field of Search .......... 355/3, 10, 40, 53; 95/13

[56] References Cited

UNITED STATES PATENTS

| | | | |
|---|---|---|---|
| 2,281,638 | 5/1942 | Sukumlyn | 355/3 |
| 2,309,960 | 2/1943 | Kershaw | 355/53 |
| 2,643,187 | 6/1953 | Linzell | 355/40 |
| 3,182,573 | 5/1965 | Clark | 355/3 |
| 3,241,466 | 3/1966 | Clark | 355/3 |
| 3,424,526 | 1/1969 | Sacre | 355/10 |
| 3,057,275 | 10/1962 | Walkup | 355/3(X) |
| 3,330,179 | 7/1967 | Zerfahs | 355/10(X) |
| 3,410,190 | 11/1968 | Browning | 95/13 |

*Primary Examiner*—John M. Horan
*Assistant Examiner*—Robert P. Greiner
*Attorneys*—Ronald Zibelli and James J. Ralabate

ABSTRACT: A camera to expose and develop an imaging member having fracturable material in an electrically insulating softenable layer. The camera has a charging device, exposure apparatus with optional components for providing contact optical screening, and a compartment to develop the exposed imaging member.

INVENTORS
RAYMOND EGNACZAK
ARNOLD L. PUNDSACK
BY David C. Petre
James J. Ralabate
ATTORNEYS INVENTORS
RAYMOND EGNACZAK
ARNOLD L. PUNDSACK
BY David C. Petre
James J. Ralabate
ATTORNEYS

CAMERA WITH DEVELOPMENT MEANS

BACKGROUND OF THE INVENTION

This invention relates in general to imaging and more specifically a camera.

There has recently been developed a migration imaging system capable of producing high quality images of high density, continuous tone, and high resolution, an embodiment in copending U.S. Pat. application Ser. No. 460,377, filed June 1, 1965 now U.S. Pat. No. 3,520,681. Generally, according to an embodiment thereof, an imaging member comprising a conducting substrate with a layer of softenable (herein, also intended to include soluble) material, containing photosensitive particles overlaying the conductive substrate is imaged in the following manner: a latent image is formed on the member, for example by uniformly electrostatically charging and exposing it to a pattern of activating electromagnetic radiation. The imaging member is then developed by exposing it to a solvent which dissolves only the softenable layer. The photosensitive particles which have been exposed to radiation migrate through the softenable layer as it is softened and dissolved, leaving an image, of migrated particles corresponding to the radiation pattern of an original, on the conductive substrate. The image may then be fixed to the substrate. For many preferred photosensitive particles, the image produced by the above process is a negative of a positive original. Through the use of various techniques, either positive to positive or positive to negative images may be made. Those portions of the photosensitive material which do not migrate to the conductive substrate may be washed away by the solvent with the softenable layer.

In general, three basic imaging members may be used: a layer configuration which comprises a conductive substrate coated with a layer of softenable material, and a fracturable and preferably particulate layer of photosensitive material at or embedded near the upper surface of the softenable layer; a binder structure in which the photosensitive particles are dispersed in the softenable layer which overcoats a conducting substrate; and an overcoated structure in which a conductive substrate is overcoated with a layer of softenable material followed by an overcoating of photosensitive particles and a second overcoating of softenable material which sandwiches the photosensitive particles. Fracturable layer or material as used herein is intended to mean any layer or material which is capable of breaking up during development and permitting portions to migrate towards the substrate in image configuration.

This imaging system generally comprises a combination of process steps which includes forming a latent image and developing with solvent liquid or vapor, or heat or combinations thereof to render the latent image visible. In certain methods of forming the latent image nonphotosensitive or inert fracturable layers and particulate material may be used to form images, as described in copending U.S. Pat. application Ser. No. 483,675, filed Aug. 30, 1965, wherein a latent image is formed by a wide variety of methods including charging an image configuration through the use of a mask or stencil; first forming such a charge pattern on a separate photoconductive insulating layer according to conventional xerographic reproduction techniques and then transferring this charge pattern to the members hereof by bringing the two layers into very close proximity and utilizing breakdown techniques as described, for example, in Carlson U.S. Pat. No. 2,982,647 and Walkup U.S. Pat. Nos. 2,825,814 and 2,937,943. In addition, charge patterns conforming to selected, shaped electrodes or combinations of electrodes may be formed by the "TESI" discharge technique as more fully described in Schwertz U.S. Pat. Nos. 3,023,731 and 2,919,967 or by techniques described in Walkup U.S. Pat. Nos. 3,001,848 and 3,001,849 as well as by electron beam recording techniques, for example as described in Glenn U.S. Pat No. 3,113,179.

In another variation of this imaging system an image is formed by the selective disruption of a particulate material overlaying or in electrostatically deformable, or wrinklable film or layer. This variation differs from the system described above in that the softenable layer is deformed in conjunction with a disruption of the particulate material as described more fully in copending U.S. Pat. application Ser. No. 520,423, filed Jan. 13, 1966 and now abandoned.

The characteristics of the images produced by this new system are dependent on such process steps as charging, exposure, and development, as well as the particular combination of process steps. High density, continuous tone and high resolution are some of the image characteristics possible. The image is generally characterized as a fixed or unfixed particulate image with or without a portion of the softenable layer and unmigrated portions of the layer left on the imaged member, which can be used in a number of applications such as microfilm, hard copy, optical masks, and strip-out applications using adhesive materials.

SUMMARY OF THE INVENTION

It is, therefore, an object of this invention to provide a camera to expose and develop imaging members as described above.

It is a further object of this invention to provide a camera with an optional contact exposure means.

It is a further object of this invention to provide a camera with an optional contact exposure means. I It is a further object of this invention to provide a compact and simply operated camera.

The foregoing objects and others are accomplished in accordance with this invention by providing a camera to expose and develop, to a visible image, an imaging member, for example, as described herein, said camera comprising charging means, exposure means with optional mean for providing contact optical screening, and developer means to develop the exposed imaging member.

BRIEF DESCRIPTION OF THE DRAWINGS

For a better understanding of the invention, as well as other objects and further features thereof, reference is made to the following detailed disclosure of this invention taken in conjunction with the accompanying drawings wherein.

DESCRIPTION OF THE PREFERRED EMBODIMENTS

Figure 1:
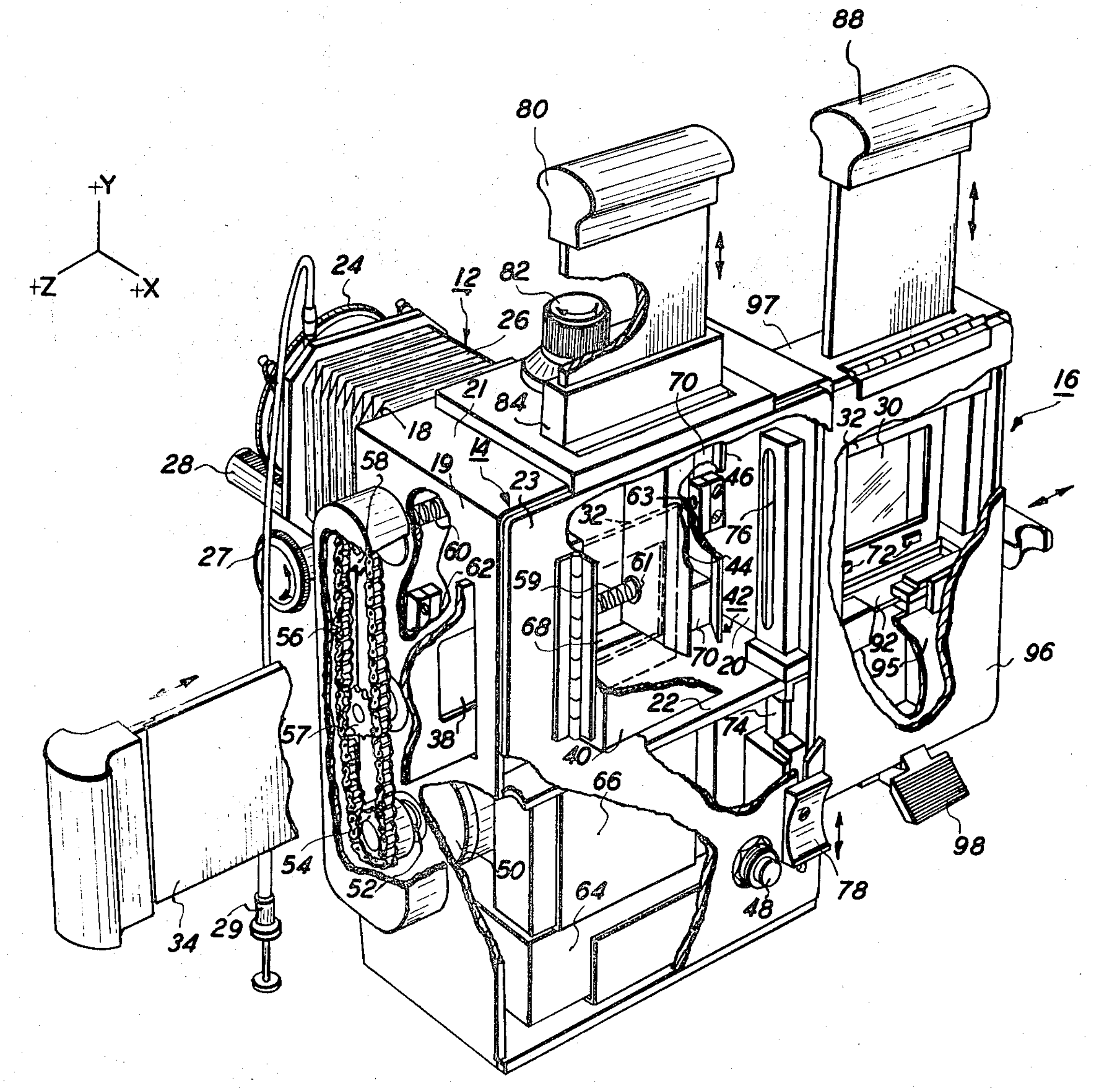
FIG. 1 is a broken-away, perspective view of the camera of this invention.
Figures 2, 3:
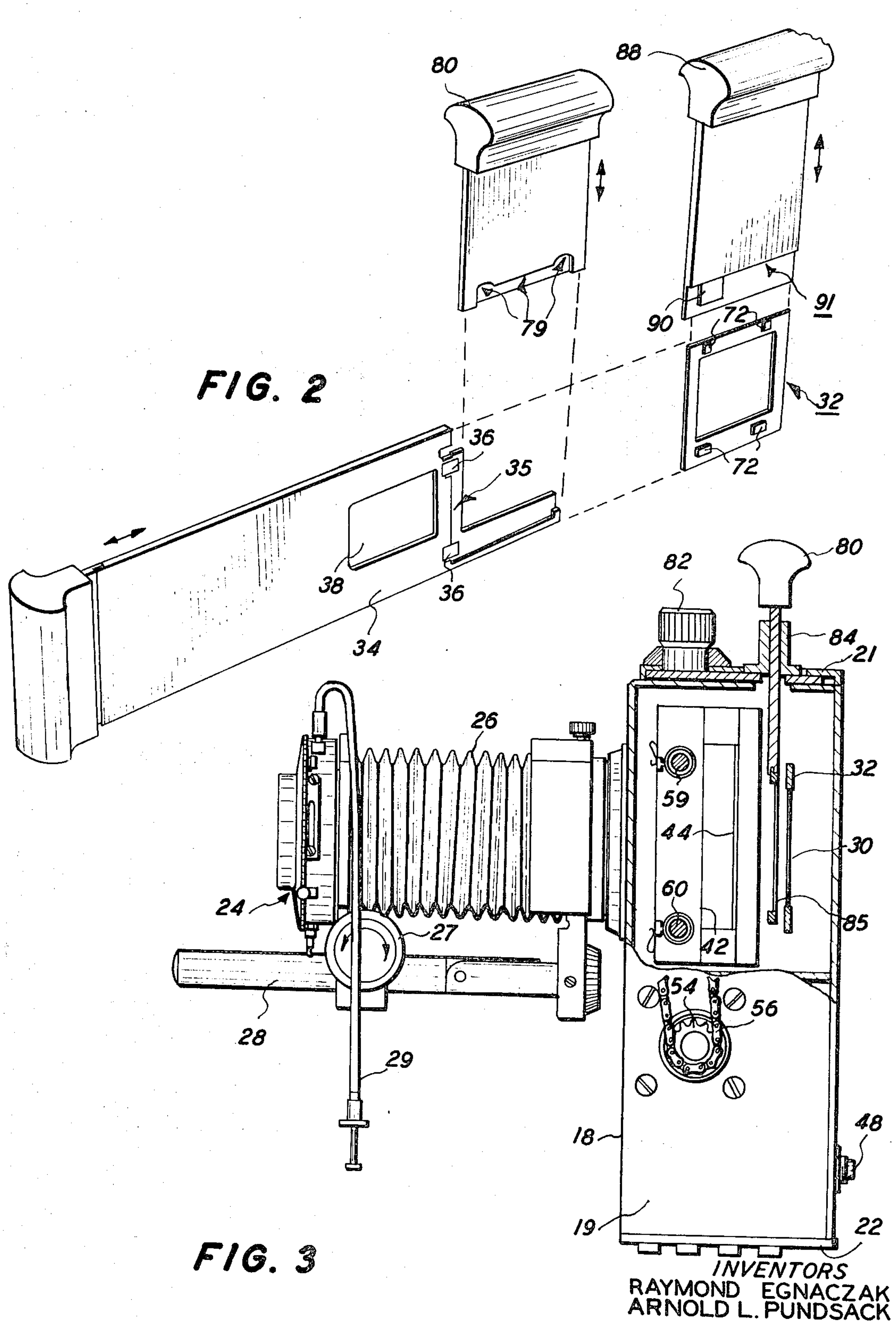
FIG. 2 is a perspective view oriented similar to FIG. 1, but showing only the slides for moving the imaging member within the camera.
FIG. 3 is a side view of the camera taken in the −Z direction with portions of the side of the camera removed, to show the interior of the light-tight housing.

Referring now to FIGS. 1 and 2, the camera of this invention may be described generally as comprising any suitable and conventional lens and shutter element 12, light-tight housing 14, and developer housing 16.

LENS AND SHUTTER ELEMENT

Lens and shutter element 12 is mounted in the front wall 13 of light-tight housing 14. Lens and shutter element 12, as illustrated, includes an adjustable shutter 24, bellows 26, hand turn knob 27 and graduated slide rod 28 to facilitate focusing.

LIGHT-TIGHT HOUSING

Light-tight housing 14 is generally defined by frontwall sidewalls 19 and 20, top and bottom walls 21 and 22, respectively, and back wall 23 with light-tight door 40 hingedly mounted thereto.

An imaging member 30 illustratively shown to be in developer housing 16 and provisionally indicated, by the dotted lines of member holder 32 in light-tight housing 14 is positioned, when in housing 14, in the member holder 32 which is held in the recess 35 in slide 34 adapted to receive the holder. The holder 32 is releasably held in the recess by spring clips 36. Imaging member 30 is removable held in holder 32 by spring clips 72. Slide 34 also includes focusing screen 38 which when in Z direction optical alinement with lens and shutter element 12 permits the user, by opening up door 40 to focus the subject image in the plane of focusing screen 38, which will be the plane of imaging member 30 when the member is optically alined in a ± Z direction. Hand knob 27 moves the lens and shutter element, through conventional gearing not shown, along graduated slide rod 28 to focus the image of the subject to be reproduced on screen 38.

After focusing, imaging member 30 is positioned in housing 14 by inserting slide 34 in the slot in sidewall 19 adapted to receive the slide and also adapted to provide a light-tight fitting when the imaging member is optically alined in housing 14. The portions of wall 19 defining the slot ensure that slide 34 will move only in an essentially ± Z direction. The positioning of the imaging member in the ± Z direction may be regulated by, for example, index marks appearing on slide 34 which may be registered with the outside surface of sidewall 19. Also, the imaging member and its holder may be mounted on slide 34 through door 40.

Once the imaging member is within housing 14, the member is ready to be processed by charging, exposing, and developing in the camera, which are generally carried out in the absence of ambient light.

Imaging member 30 is sensitized with a corona discharge device 42, which by the mechanism illustrated, may be caused to traverse across and adjacent the imaging member in a ± Z direction, one or a number of times to charge the face of the imaging member facing the corona discharge device and lens and shutter element 12, to a uniform surface potential.

Corona discharge device 42 includes corona discharge wire 44 and conductive shield 46. A more detailed description of this type of corona discharge device may be found in Vyverberg U.S. Pat. No. 2,836,725. The corona discharge device 42 is electrically activated and is caused to traverse across the face of the imaging member to deposit charge thereon by pressing button 48, thereby starting a motor held in housing 50 causing rotation of shaft 52 and sprocket wheel 54 rigidly secured thereto. For example, a corona wire spaced about five-eighths of an inch from the face of the imaging member and traversed once across the face of the member at a rate of about 3 inches/second was found to produce a suitable charge potential for the production of quality images. Rotating sprocket wheel 54 in turn advances chain 56 thereby rotating identical sprocket wheels 57 and 58 secured, respectively, to lead screws 59 and 60. Lead screws 59 and 60 are journaled in suitable bearings in the sidewalls 19 and 20 and are mounted in a manner to have their axis of parallel to the focal plane of the camera lens as well as parallel to the front face of the optically alined imaging member. The turning lead screws engage dogs 61 secured in the side of corona discharge device 42 to cause a turning motion of the lead screws to be translated to a rectilinear advancing of the corona discharge device in a Z direction towards the chain drive mechanism. Relay switch button 62 when depressed by the advancing corona discharge device, operates to stop the motor in housing 50 and halt the advance of corona device 42, and deenergize corona wire 44 by breaking the electrical contact thereto. Activating the unidirectional rotating motor again causes the corona discharge device to traverse in a −Z direction, the ends of the lead screws being conventionally adapted to reverse the direction of travel of dogs 61 and the corotron 42, the travel of the corotron in the −Z stopped by relay switch button 63 to stop the corotron in a position as illustrated in FIG. 1. The motor in housing 50 is powered by battery 64. In addition to causing advancement of the corona discharge device, the pressing of button 48 also actuates corona discharge wire by connecting the wire to a high voltage source. Charging of wire 44 is effected by converting to high voltage, a relatively low direct current voltage from battery 64 by transformer 66. This d.c. transformer, for example, may be an SMU-5 Arnold Magnetics thin-verter and the battery, power source 64, may be a 30 volt Burgess K20 battery. Any suitable conventional electrical circuitry to accomplish activation and movement of the corona device 42 may be used.

The relatively high voltages required across wire 44 to effect corona discharge, for example, 6,000 volts, are supplied to the wire by conventionally electrically connecting the output of transformer 66 to conducting strips 68 overlying insulating strips, both strips secured to the inside of top wall and bottom wall 21 and 22, as to ensure electrical contact with spring-biased brushes connected electrically to opposite ends of corona wire 44 secured at opposite ends of corona device 42 in insulating blocks 70.

Any suitable corona discharge source may be used herein. Typical sources are disclosed in Walkup U.S. Pat. No. 2,777,957, and radioactive sources of corona, as described by Dessauer, Mott, Bogdenoff, Photo Eng. 6, 250 (1955).

Once the imaging member is charged as described, the imaging member is ready to be exposed. It is preferred in some processing modes to isolate the chamber of housing 14 from developer housing 16, once member 30 is charged, to prevent ingress of solvent vapors from the chamber of housing 16 into the chamber of housing 14. The chamber of housing 14 is isolated from the developer housing 16, by sliding rectangular elongate sealing member 74 upwards from its unsealed position shown in FIG. 1 to completely close the passageway 76 between the chamber of housing 14 and the chamber of housing 16. Member 74, is conveniently raised or lowered by hand by means of concave handled member 78.

Slides 34, as well as slides 80, 88 and sealing means 74 and 92, also terminate at their outer end in convenient finger grips.

OPTICAL SCREENING

The imaging member may then be exposed. Optionally, contact optical screen exposure, for example, as disclosed in Kosloff, "Photographic Screen Process Printing," 192—205 (2d ed. 1962), may be effected, for example, to extend tonal response of certain imaging members, by inserting an appropriate optical screen into the recessed portion 79 of slide 80. The screen is removably held in said recess adapted to receive the screen. After charging, slide 80 and the optical screen are advanced in a −Y direction into the chamber of housing 14 to position the screen in register with and parallel to but spaced apart from imaging member 30. In this position, hand knob 82 may be turned to advance, by conventional gearing not shown, slide 80, its retained contact screen and slide-receiving and guiding member 84 in an X direction to nonabrasively position the contact screen contiguous to the imaging member. In this position, contact optical screen exposure of the imaging member may take place. After exposure, knob 82 is turned in an opposite direction to cause slide 80, the contact screen and member 84 to move in a −X direction, thus advancing the contact screen out of its contiguous relation with the sensitized imaging member, to permit free movement of slide 34 and member containing holder 32 into, for example, the chamber of developer housing 16 for the next processing step. Knob 82 may also be used to critically adjust the distance between the screen and the imaging member when in a spaced-apart, operating relationship.

After exposure, which forms a latent image in or on the imaging member, the member may be removed from the camera to be developed elsewhere or may be developed directly in the developer housing of the camera, to be described.

DEVELOPER HOUSING

After charging and exposure, as described above, sealing member 74 is advanced to its −Y most position, substantially as shown, to open up passageway 76 thereby permitting the advancing of slide 34 and member holder 32 into the upper region of the developer housing 16 to place the holder 32 in a position illustrated in FIG. 1. With the slide 34 in this position, slide 88 with spring clip 90 attached thereto is advanced downward to firmly engage the holder 32 in the recess portion 91 of slide 88 adapted to receive the holder. Once this engagement is made, slide 34 may be advanced in a Z direction leaving holder 32 releasably held by slide 88. In this position, rectangular elongate sealing member 92 may be advanced in a −Z direction to create a passageway between the upper chamber of developer housing 16 and a lower portion comprising a container 95 holding a solvent liquid, not shown. As illustrated, developer housing 16 is generally a rectangular structure with the rear wall 96 conveniently hinged onto top wall 97 to provide ready access to the interior of the developer housing. The rear wall may be latched in a closed position by any convenient means, for example, by spring-biased latch 98.

Once the passageway between the upper and lower chambers of housing 16 has been opened, slide 88 may advance the holder 32 in a −Y direction toward the solvent liquid thereby advancing the holder and the imaging member into solvent liquid container 95 to completely immerse the imaging member 30 in the solvent effecting image development as further described in the aforementioned copending applications. After immersing for a sufficient time in the solvent liquid, slide 88 may be advanced in a Y direction advancing the imaging member out of the solvent liquid into the upper chamber of housing 16 and further advancing it from the upper chamber through the slot in top wall 97, thereby removing the now imaged member from the camera into the ambient light whereupon the member holder 32 may be manually disengaged from slide 88 and the imaging member 30 removed from its holder to be viewed directly, used for image projection purposes, for the production of hard copy or used in any other conventional manner known to those skilled in the art for which, for example, conventional silver halide microfilm positives or negatives may be used.

After development, the imaged member may also be removed from the camera by opening rear wall 96 and removing holder 32 from slide 88.

An unprocessed imaging member may be inserted in holder 32 and the holder inserted in recess 35 of slide 34 disengaged from the camera. Slide 34 and the imaging member may then be inserted into light-tight housing 14 and the imaging process repeated.

Referring now to FIG. 3, there is illustrated a partially cutaway side view of the camera of this invention taken in the −Z direction of FIG. 1. The view illustrated in FIG. 3 illustrates more clearly the out of contact position of optical screen 85 in relation to member holder 32 and imaging member 30.

It will be appreciated that as disclosed in the aforementioned copending application, solvent vapor development is one of the alternative modes of development to the solvent liquid development described above. In solvent vapor development, the softenable layer and unmigrated fracturable material, typically are not washed away during development. Solvent vapor development may conveniently be accomplished by the camera of this invention by positioning the imaging member after charging and exposure in the upper chamber of developer housing 14 as illustrated in FIG. 1, while sliding sealing member 92 is extended in the −Z direction to create a passageway, thereby permitting vapors of the solvent liquid contained in container 95 to pass into the upper chamber thereby filling that chamber with vapors, and solvent vapor developing the imaging member which may then be removed for use. Solvent, as used herein, is intended to include a liquid which sufficiently swells the softenable layer of the imaging members hereof, upon contact therewith, to cause imagewise migration of fracturable material. Solvent develop, as used herein, is intended to include solvent liquid and solvent vapor development and combinations thereof.

In operation, an imaging member is placed in member holder 32 which in turn is placed in the recess portion of slide 34 adapted to receive the holder, the holder and slide then being advanced into the chamber of housing 12 and optically alined. Button 48 is pushed which activates the motor in housing 50 and the power supply for corona discharge device 42. The device moves across the face of the imaging member thereby charging it to a surface potential. The device, after traversing once across the member, depresses a relay switch, stopping its advance and cutting the power supply. Optionally, a contact optical screen may be optically alined in contact with the imaging member. The imaging member is then exposed by activating the shutter release 29. The vapor seal between the chamber of housing 14 and the upper chamber of housing 16 is opened and the imaging member is advanced into the upper chamber of housing 16. Slide 88 is advanced in a −Y direction, the spring clip on the slide engaging holder 32 thereby permitting slide 34 to be advanced in a Z direction to disengage itself from holder 32. The seal sealing the solvent tank from the upper chamber of housing 16 is opened and slide 88 is advanced in a −Y direction to immerse the imaging member in the solvent liquid where it is developed. After development, slide 88 is advanced in a Y direction to remove the developed and visible image from the camera. Of course, alternatively, it is possible to vapor develop the imaging member by leaving the exposed member in the upper chamber of housing 16 and leaving the member in the vapor zone and to employ the other alternatives disclosed herein, as well as employing any imaging members which are advantageously employed in the inventive apparatus.

For example, an imaging member 30 comprising amorphous selenium evaporated onto hydrogenated Piccopale 100, a highly branched polyolefine from Pennsylvania Industrial Chemical Co., on an aluminized Mylar substrate, exposed at a shutter speed of a one half-second, at an *f* rating of 5.6, to a subject 10 feet away, with one pass of the corotron, the wire carrying a potential of about 6,000 volts and having a diameter of about 3 mills, produced a latent image which was solvent liquid developed in 1,1,1-trichloroethane to produce a high resolution, dense negative image of an original subject.

Thus, there has been described a compact and simply operated camera which charges, exposes and develops imaging members as described herein.

It will be understood that various changes in the details, materials, steps, and arrangements of parts which have been herein described and illustrated in order to explain the nature of the invention will occur to and may be made by those skilled in the art upon a reading of this disclosure, and such changes are intended to be included within the principle and scope of this invention.

We claim:

1. A camera comprising:
a. a light-tight housing;
b. a lens mounted on said housing;
c. means to optically aline within an image plane of said lens an imaging member with said light-tight housing;
d. corona charging means positioned within said light-tight housing;
e. means to advance said corona charging means into and out of charging means into and out of charging relationship with the imaging member; and
f. means comprising a light-tight compartment mounted on said housing and containing a light-tight communicating passageway between said compartment and said housing adapted to enable passage of said imaging member therethrough to solvent develop said imaging member.

2. A camera according to claim 1 wherein said means to solvent develop comprises:
a. a light-tight compartment;
b. an upper chamber of said light-tight compartment;
c. a first partition separating said upper chamber and said light-tight housing, and a passageway defined therein adapted to pass therethrough an imaging member;
d. a first slide;
e. means to engage and hold an imaging member at one end of said slide;

f. a sleeve in said upper chamber portion of said light-tight compartment adapted to receive said slide in light-tight engagement, said slide being adapted to engage and hold said member in said upper chamber;

g. a lower chamber of said light-tight compartment;

h. a liquid container in said lower chamber in the path of advance of said slide and the imaging member held thereon adapted to receive an imaging member; and i. a second partition separating said upper chamber and said lower chamber and a passageway defined therein in the path of advance of said slide adapted to pass said slide from said upper chamber to said lower chamber by advancing said slide.

3. A camera according to claim 1 wherein said corona charging means comprises:

a. a supporting frame; and b. at least one corona charging wire secured to said frame and electrically coupled to a power source, said wire substantially parallel to said imaging member.

4. A camera according to claim 3 wherein said means to advance comprises:

a. drive means;

b. at least one lead screw substantially parallel to said imaging member mounted for rotation in said light-tight housing and driven by said drive means; and c. means within said supporting frame adapted to receive said lead screw for movement therealong.

5. A camera according to claim 2 wherein said means to optically aline an imaging member comprises:

a. focusing means in operative relation to said lens;

b. a second slide;

c. means at one end of said second slide to releasably hold an imaging member; and d. a sleeve in said light-tight housing adapted to receive said second slide in light-tight engagement.

6. A camera according to claim 5 wherein said means to solvent develop includes a slidable seal between said upper chamber and said lower chamber adapted to selectively seal off or open up the passageway defined in said second partition.

7. A camera according to claim 6 wherein said means to solvent develop includes a slidable seal between said upper chamber and said light-tight housing to selectively seal off or open up the passageway defined in said first partition.

8. A camera according to claim 4 wherein said drive means comprises:

a. a motor;

b a drive sprocket wheel connected in drive relation to said motor;

c. a driven sprocket wheel axially mounted on each lead screw; and d. a chain adapted to mate with said drive and driven sprocket wheels whereby rotation of said drive sprocket wheel is transmitted to said driven sprocket wheel by said chain to cause the lead screw to axially rotate to cause linear movement of the corona discharge device.

9. A camera comprising:

a. a light-tight housing;

b. a lens mounted on said housing;

c. means to optically aline within an image plane of said lens an imaging member within said light-tight housing;

d. optical screening means to advance an optical screen into and out of optical alinement between said imaging member and said lens;

e. a light-tight compartment;

f. an upper chamber of said light-tight compartment;

g. a first partition separating said upper chamber and said light-tight housing, and a passageway defined therein adapted to pass therethrough an imaging member;

h. a slide;

i. means to engage and hold an imaging member at one end of said slide;

j. a sleeve in upper chamber portion of said light-tight compartment adapted to receive said slide in light-tight engagement, said slide being adapted to engage and hold said member in said upper chamber;

k. a lower chamber of said light-tight compartment;

l. a liquid container in said lower chamber in the path of advance of said slide and the imaging member held thereon adapted to receive an imaging member; and m. a second partition separating said upper chamber and said lower chamber and a passageway defined therein in the path of advance of said slide adapted to pass an imaging member from said upper chamber to said lower chamber by advancing said slide.

10. A camera according to claim 9 including in combination:

a. corona charging means positioned within said light-tight housing; and b. means to advance said corona charging means into and out of charging relationship with the imaging member.

11. A camera according to claim 9 wherein said imaging member comprises a softenable layer not greater than about 20 microns thick containing fracturable material, on a substrate.

12. A camera according to claim 1 including in combination optical screening means to advance an optical screen into and out of optical alinement between said imaging member and said lens.

13. A camera according to claim 2 including in combination optical screening means to advance an optical screen into and out of optical alinement between said said imaging member and said lens.

14. A camera according to claim 5 including in combination optical screening means to advance an optical screen into and out of optical alinement between said imaging member and said lens.

15. A camera according to claim 3 including in combination optical screening means to advance an optical screen into and out of optical alinement between said imaging member and said lens.

16. A camera according to claim 5 wherein said imaging member comprises a softenable layer not greater than about 20 microns thick containing fracturable material, on a substrate.

17. A camera according to claim 12 wherein said imaging member comprises a softenable layer not greater than about 20 microns thick containing fracturable material, on a substrate.

18. A camera according to claim 15 wherein said imaging member comprises a softenable layer not greater than about 20 microns thick containing fracturable material, on a substrate.